United States Patent

Picciano et al.

[15] 3,702,926

[45] Nov. 14, 1972

[54] FET DECODE CIRCUIT

[72] Inventors: James K. Picciano, South Burlington; Joseph Zauchner, South Hero, both of Vt.

[73] Assignee: International Business Machines Corporation, Armonk, N.Y.

[22] Filed: Sept. 30, 1970

[21] Appl. No.: 76,878

[52] U.S. Cl. ..................235/154, 307/205, 307/238, 307/251, 307/279, 340/174 TB

[51] Int. Cl. ......................H03k 17/60, H03k 13/243

[58] Field of Search .......235/154; 340/347; 307/108, 307/205, 251, 246, 279, 238

[56] References Cited

UNITED STATES PATENTS

| | | | |
|---|---|---|---|
| 3,564,290 | 2/1971 | Sonoda | 307/251 |
| 3,440,444 | 4/1969 | Rapp | 307/205 |
| 3,461,312 | 8/1969 | Farber et al. | 307/251 |
| 3,395,291 | 7/1968 | Bogert | 307/205 |

*Primary Examiner*—Maynard R. Wilbur
*Assistant Examiner*—Leo H. Boudreau
*Attorney*—Hanifin and Jancin and Willis E. Higgins

[57] ABSTRACT

An FET decode circuit having a bootstrap capacitor connected across the gate and source of an input field effect transistor (FET) in which no current flows through the input FET when the bootstrap capacitor is discharged. Means, preferably an FET with its current flow electrodes connected across the bootstrap capacitor, is provided for completing a discharge path parallel to the boot-strap capacitor and internal to the decode circuit. A discharge path independent of the input field effect transistor is so provided. A memory accessing means including a plurality of the decode circuits may discharge the bootstrap capacitors of unselected decode circuits without pulling current through a memory drive circuit to which the decode circuits are connected.

15 Claims, 3 Drawing Figures

PATENTED NOV 14 1972

3,702,926

INVENTORS
JAMES K. PICCIANO
JOSEPH ZAUCHNER

BY Willis E. Higgins

ATTORNEY

FET DECODE CIRCUIT

BACKGROUND OF THE INVENTION

1. Field of the Invention

This invention relates to a decode circuit allowing the selective application of drive pulses from a drive circuit to a memory. More particularly, it relates to an FET decode circuit which is capable of being used with a single bipolar memory drive circuit in a memory accessing means for the selective application of drive pulses to a potentially unlimited number of FET or other memory storage cells.

2. Description of the Prior Art

FET decode circuits which are each connected between a bipolar memory drive circuit and a memory drive line of a memory accessing means in order to control selectively the application of drive pulses to the memory from the memory drive circuit are known in the art. For example, such a circuit is disclosed by Linton and Sonoda, IBM Technical Disclosure Bulletin, May 1970, page 2082. A plurality of the circuits described there are connected in parallel to a memory drive circuit. The outputs of the decode circuits are each connected to a different memory drive line. Each of the decode circuits has a bootstrap capacitor connected between the gate and source of an input FET. In operation, the bootstrap capacitor in each of the decode circuits is charged, then all of the bootstrap capacitors are discharged with the exception of the bootstrap capacitor in the decode circuit connected between the memory drive circuit and the memory drive line on which a drive pulse is desired.

A potential problem in the simultaneous discharge of the bootstrap capacitors in the plurality of decode circuits except the decode circuit connected to the memory drive line to be pulsed is that discharge of these bootstrap capacitors in the Linton and Sonoda circuit draws a differential current through the bipolar memory drive circuit for discharge of each capacitor. With large memory arrays, requiring, for example, 32 parallel decode circuits, discharge of the bootstrap capacitors may produce a large enough current requirement to blow out a bipolar transistor having a large voltage across it in the memory drive circuit. To avoid such a problem, the Linton and Sonoda circuit provides an arrangement for reducing the size of the bootstrap capacitor. This enables the Linton and Sonoda circuit to be used with memories having relatively high densities.

FET memories now being proposed would contain 2,000 or even 8,000 memory bits in a single chip of silicon measuring about 0.1 inch square. Such FET memories will require larger numbers of decode circuits, for example 64 or more on the single chip connected in parallel between a memory drive circuit and drive lines for the memory. The situation is even more severe in the case of a dynamic cell FET memory, which is periodically regenerated. During regeneration, a total of 2048 decode circuits are connected at one time in parallel to a single memory drive circuit. Discharging this many capacitors simultaneously in a memory accessing means requiring current to be supplied through the input FET's of the decode circuits for discharging the bootstrap capacitors would be out of the question. Such FET memories require improvement in the decode circuits available in the prior art to avoid blowing out bipolar transistors in their memory drive circuits.

SUMMARY OF THE INVENTION

Accordingly, it is an object of this invention to provide a decode circuit that can be utilized with increasing densities of FET integrated circuit memories.

It is another object of the invention to eliminate decode circuits as a limiting factor in the number of FET memory integrated circuits that may be provided in a single integrated circuit chip.

It is a further object of the invention to provide a decode circuit having a bootstrap capacitor across an input FET in which current need not be pulled through the input FET to discharge the bootstrap capacitor.

It is yet another object of the invention to avoid the necessity to supply current through a bipolar transistor connected to a large number of parallel capacitor load elements bootstrapping input FET's in decode circuits when discharging the capacitor load elements.

These and related objects may be obtained with this FET decode circuit and memory accessing means. The decode circuit has an input FET with a gate and two current flow electrodes. A bootstrap capacitor is connected across the gate and one of the current flow electrodes of the input FET. The presence of a charge on the bootstrap capacitor allows current to pass through the input FET. Means, preferably a second FET connected across the bootstrap capacitor, is provided for completing a discharge path parallel to the bootstrap capacitor and internal to the decode circuit. Means is provided controlling the means for completing a discharge path to cause completion of the discharge path. By so providing means for completing a discharge path across the bootstrap capacitor independent of the input FET, no differential current flows through the input FET as a result of the discharge of the bootstrap capacitor.

A load accessing means for, e.g., a memory in accordance with the invention includes a plurality of decode circuits as described immediately above each having its input FET connected to a load, e.g., memory driver circuit. The output or load terminal of each decode circuit is connected to a load, e.g., a drive line of the memory. Memory address lines are connected to the means controlling the means for completing a discharge path in each decode circuit. Selection of a particular memory drive line to receive a drive pulse is accomplished by allowing the address lines to activate the means controlling the means for completing a discharge path in the unselected decode circuits, thus discharging their bootstrap capacitors and preventing a drive pulse from being supplied to the memory drive lines at their outputs. The bootstrap capacitor of the decode circuit connected to the memory drive line to be pulsed is not discharged because the address for the memory drive line disables the address lines connected to its decode circuit, and a path allowing the drive pulse to be supplied to the memory drive line from the memory drive circuit is provided. The memory accessing means may be operated in this manner without requiring a current flow from the memory drive circuit for discharge of the bootstrap capacitors of the unselected decode circuits, thus eliminating the decode circuit as a limiting factor in the number of FET memory integrated circuits that may be provided in a single integrated circuit chip.

The foregoing and other objects, features, and advantages of the invention will be apparent from the following more particular description of the preferred embodiments of the invention, as illustrated in the accompanying drawings.

DESCRIPTION OF THE PREFERRED EMBODIMENTS

Figures 1, 2:
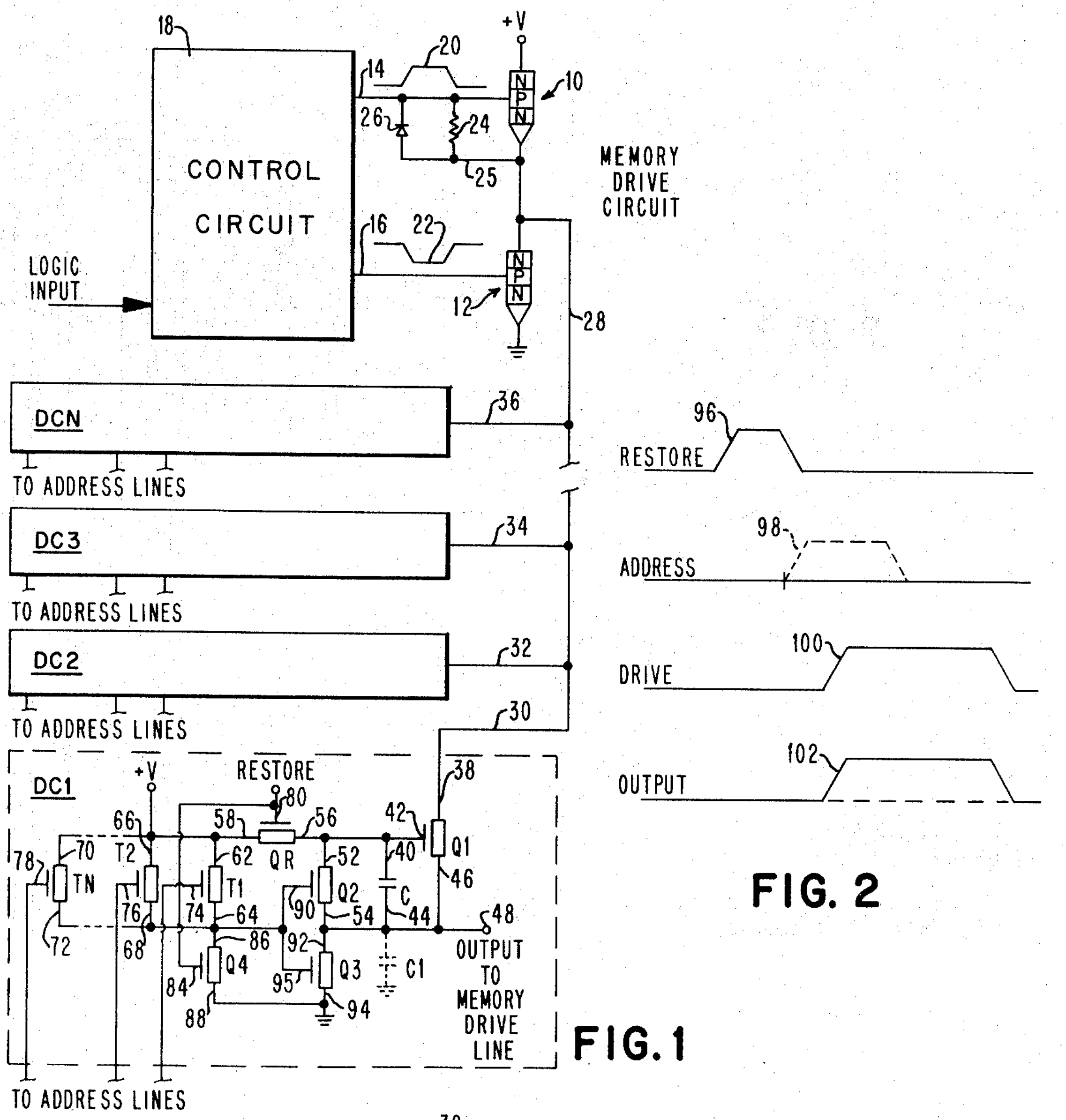
FIG. 1 is a schematic diagram of a decode circuit and memory accessing means in accordance with the invention.
FIG. 2 is a pulse program for the memory accessing means of FIG. 1.

Turning now to the drawings, more particularly to FIG. 1, there is shown a decode circuit and memory accessing means in accordance with the invention. In the following discussion, all FET's are assumed to be of the n-channel type. P-channel FET's may be employed, in which case the positive polarity of signals applied to the gates of the FET's in the following discussion must be reversed. It is further assumed that the FET circuits described are operated with a negative substrate bias, causing the FET's to operate in an enhancement mode.

The memory accessing means includes a memory drive circuit which has bipolar transistor 10 with its emitter connected to the collector of bipolar transistor 12. The collector of transistor 10 is connected to a positive voltage source. The emitter of transistor 12 is grounded. Control circuit 18 is connected to the bases of transistors 10 and 12 by lines 14 and 16, respectively. Control circuit 18 acts to turn transistor 10 on and turn transistor 12 off when a positive pulse is desired on line 28. When it is desired to ground line 28, transistor 10 is turned off and transistor 12 is turned on by control circuit 18. Positive pulse 20 on line 14, applied to the base of transistor 10, turns it on. Concurrently applied negative pulse 22 on line 16, applied to the base of transistor 12 turns it off. The absence of a pulse on line 14 turns transistor 10 off, while the absence of a pulse on line 16 allows transistor 12 to remain on. Thus, line 28 is normally grounded. The pulses 20 and 22 are supplied by logic circuits included within control circuit 18 and controlled by a logic input. These logic circuits are of a known type, such as high speed current switch logic. Resistor 24 and diode 26, connected in parallel between the base and emitter of transistor 10 by line 25, serve as conventional protective devices for transistor 10.

Decode circuits DC1-DCN are connected in parallel to line 28 by lines 30, 32, 34 and 36, respectively. Decode circuits DC2-DCN are identical to decode circuit DC1, which will be described in detail. Input FET Q1 of decode circuit DC1 has its drain 38 connected to line 30. Bootstrap capacitor C has its electrode 40 connected to gate 42 of FET Q1, and its electrode 44 connected to source 46 of FET Q1. FET Q1 has its current flow electrodes 38 and 46 connected between input line 30 and output 48 to a memory drive line. Discharge FET Q2 has its current flow electrodes 52 and 54 connected to electrodes 40 and 44 of bootstrap capacitor C, respectively. Q2 therefore forms a parallel discharge path for C. Restore FET QR has its current flow electrodes 56 and 58 connected between bootstrap capacitor C and a positive voltage source. A plurality of parallel FET's T1–TN have their current flow electrodes 62 and 64, 66 and 68, 70 and 72, respectively, connected between the positive voltage source and gate electrode 90 of discharge FET Q2. Gates 74, 76 and 78 of parallel FET's T1–TN are each connected to a different address line. FET Q3 has one current flow electrode 92 connected to source 46 of input FET Q1, which includes parasitic capacitance C1 and the other current flow electrode 94 connected to ground. Gate electrode 95 of FET Q3 and gate electrode 90 of FET Q2 have a common connection. FET Q4 is connected between gate 90 of discharge FET Q2 and ground by its current flow electrodes 86 and 88. Gate electrodes 80 and 84 of FET QR and Q4 are commoned.

The operation of decode circuit DC1 and the memory accessing means of FIG. 1 will now be explained through use of the pulse program shown in FIG. 2. The decode circuits DC1-DCN are first initialized by charging all of their bootstrap capacitors C by means of a restore pulse 96 applied to gate electrode 80 of FET QR. This turns FET QR on, allowing the positive voltage source to charge the bootstrap capacitor C. Simultaneous application of restore pulse 96 to gate 84 of FET Q4 turns that FET on, grounding gate 90 of FET Q2 to assure that Q2 is off. After restore pulse 96, all of the input FET's Q1 of decode circuits DC1-DCN are in an on condition.

The input FET's Q1 of all but the decode circuit connected to a memory drive line to be pulsed are now turned off by discharging their bootstrap capacitors C. This is done by pulse 98 on one or more of the address lines connected to the gates 74, 76 and 78 of parallel FET's T1–TN in each decode circuit. In practice, a particular address which identifies a memory drive line to be selected, and hence to receive a drive pulse, serves to disable the address lines connected to the parallel FET's T1–TN of the particular decode circuit coupled to the desired memory drive line. At least one of the address lines connected to the other decode circuits is not so disabled by the particular address, and a pulse serving to turn on one of the FET's T1–TN in each of the remaining decode circuits is provided. Gate 90 of discharge FET Q2 is then raised to +V potential to turn Q2 on.

Assuming first that no pulse is received on any of the address lines connected to FET's T1-TN of decode circuit DC1, as indicated by the solid address pulse curve, drive pulse 100 is supplied at line 28 by the bipolar memory drive circuit through the simultaneous application of positive pulse 20 to transistor 10 and negative pulse 22 to transistor 12, thus turning transistor 10 on and transistor 12 off. Transistor 12 isolates line 28 from ground and transistor 10 applies the +V potential to line 28. Since no pulse has been provided to any of the address lines of decode circuit DC1, FET Q2 remains off because no positive signal is applied to its gate 90. Bootstrap capacitor C remains charged, and FET Q1 is therefore on. Pulse 102, corresponding to drive pulse 100 is therefore received at output 48 of decode circuit DC1, connected to the desired memory drive line. Drive pulse 100 corresponds to the duration of simultaneous pulses 20 and 22 supplied to transistors 10 and 12. At the termination of pulses 20 and 22, transistor 10 is turned off and transistor 12 is turned on, thus lowering line 28 to ground to terminate drive pulse 100 and corresponding output pulse 102.

Assuming now that positive pulse 98 shown in dotted line on the address pulse curve of FIG. 2 is supplied to one or more of the address lines of decode circuit DC1, one or more of the parallel FET's T1–TN is turned on. As a result, gate 90 of FET Q2 rises to +V potential, turning FET Q2 on. A discharge path for bootstrap capacitor C internal to decode circuit DC1 is therefore provided. During the discharge of bootstrap capacitor C, no current flows through input FET Q1. As a result, there is no current load through bipolar transistor 10, which is in an off condition at this time. A voltage drop of +V is present across transistor 10 at this time, and if a current were required to be pulled through it for discharging a large number of capacitive load elements simultaneously, the power required would require an extremely large integrated circuit transistor to handle the power and/or maintain the output level requirements, far in excess of the size required to supply the drive pulse 100. By providing the discharge path for bootstrap capacitor C through FET Q2 independent of input FET Q1, such a current load on bipolar transistor 10 is avoided, and a large number of such decode circuits may have their bootstrap capacitors C discharged simultaneously and very rapidly without risk of damage to the memory drive circuit. Simultaneously with discharge of bootstrap capacitor C, parasitic capacitance C1 is discharged through FET Q3, the gate electrode 95 of which is also at +V potential.

Input FET Q1 is now in the off condition, and drive pulse 100 on line 30 is prevented from being transmitted to output 48, as shown in the dotted line portion of the output curve in FIG. 2. No pulse is provided on the memory drive line to which decode circuit DC1 is connected.

Figure 3:
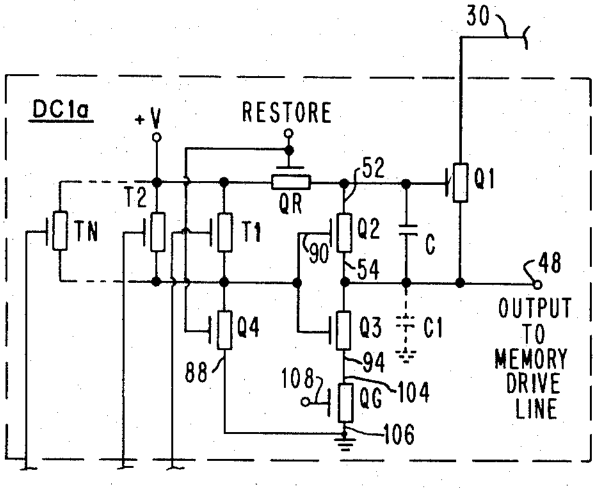
FIG. 3 is a schematic diagram of an alternative embodiment of a decode circuit in accordance with the invention that may be used in the memory accessing means of FIG. 1.

FIG. 3 shown an alternative embodiment of the decode circuit in FIG. 1, which may be substituted in the memory accessing means of FIG. 1. This decode circuit DC1a has an FET QG with its current flow electrodes 104 and 106 connected between current flow electrode 94 of FET Q3 and ground. The presence of FET QG allows an output pulse 102 to remain at output 48 even though the address lines connected to decode circuit DC1a are changed after 102 has reached its positive level. Electrodes 54 and 52 of FET Q2 are more positive than gate 90 with QG off. C and C1 cannot be discharged, consequently the address lines can now be changed to select an address elsewhere without deselecting the first selected line. With FET QG in an off condition, restore pulse 96 charges bootstrap capacitor C through FET QR. With output 48 at +V potential minus the two threshold voltages of transistor 10 and FET Q1, the presence of a multiplex pulse 98 alone on one or more of the address lines is insufficient to turn on FET Q2 when gate 90 goes to +V potential. What is additionally required is a pulse to gate 108 of FET QG to turn it on, lowering current flow electrode 54 of FET Q2 and current flow electrode 94 of FET Q3 to ground. As a result, FET's Q2 and Q3 turn on, and discharge of bootstrap capacitor C and parasitic capacitance C1 occurs in a similar fashion to discharge in decode circuit DC1. If the memory drive line connected to decode circuit DC1a is to be pulsed, the address of this drive line serves to inhibit the pulse to gate 108 of FET QG. Discharge FET Q2 does not turn on, even though multiple signals on one or more of the address lines may turn on one or more of FET's T1–TN, raising gate 90 of FET Q2 to +V potential.

The use of the circuit of FIG. 3 allows five address lines, for example, to serve $32^2$ decode circuits through multiplexing, rather than 32 decode circuits, as is the case without multiplexing. The gating transistor QG is easily provided with each decode circuit and is much simpler than multiplexing schemes associated with the address lines themselves.

In a typical actual example, a memory element accessing means contains 64 of the decode circuits DC1 or DC1a on a single integrated circuit chip during operation or 2048 circuits on a total of 64 integrated circuit chips during regeneration of a dynamic memory. Each of the decode circuits contains 6 parallel FET's T1–TN. The bootstrap capacitor C of each decode circuit is about 0.1 to 0.3 picofarads, and operation of the decode circuit in the manner described above allows discharge of bootstrap capacitor C in about 10 nanoseconds without producing any current flow through the bipolar memory drive circuit. Such a memory accessing means is capable of accessing a 2,000 bit FET memory. The decode circuits DC1 or DC1a can be used equally well in a memory accessing means for an 8,000 bit FET memory, which would require 256 of the decode circuits on a single integrated circuit chip during normal operation and a correspondingly greater number on a plurality of integrated circuit chips during regeneration connected to a memory drive circuit.

It should now be apparent that a decode circuit and memory accessing means capable of achieving the stated objects has been provided. Discharge of the bootstrap capacitor of the input FET to the decode circuits draws no current from a memory drive circuit to which the parallel decode circuits are connected. The decode circuits have been eliminated as a limiting factor in the number of memory elements that may be provided in a single integrated circuit memory chip and accessed by a single memory accessing means.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A load accessing means comprising:
   A. a plurality of load terminals,
   B. a load driver circuit, and
   C. a plurality of parallel decode circuits each serially connected to said load driver circuit and having:
      1. an input field effect transistor with a gate and two current flow electrodes,
      2. a capacitor connected across the gate and one of the current flow electrodes, the presence of a charge on said capacitor allowing current to pass through said input field effect transistor from one of said two current flow electrodes to the other of said electrodes, 3. a controllable switch for completing a discharge path parallel to said capacitor, said switch having two terminals, each of the terminals being connected to one of the electrodes of said capacitor, and 4. means controlling said switch to cause completion of the discharge path, each of said decode circuits having the current flow electrodes of its input field effect transistor connected between said load driver circuit and one of said load terminals, said means controlling said controllable switch for completing a discharge path of each decode circuit connected to a plurality of address lines for one of said load terminals, an output of each decode circuit connected to one of said load terminals.

2. A load accessing means as in claim 1 wherein said capacitor of each said decode circuit is connected across the gate and source of said input field effect transistor.

3. A load accessing means as in claim 2 wherein said controllable switch of each said decode circuit is a discharge field effect transistor having its current flow electrodes each connected to one of the electrodes of said capacitor.

4. A load accessing means as in claim 3 wherein said means of each said decode circuit controlling said discharge field effect transistor is a plurality of parallel field effect transistors connected between a voltage source and the gate of said discharge field effect transistor, the gate of each said plurality of parallel field effect transistors being adapted for connection to a memory address line.

5. A load accessing means as in claim 1, each said decode circuit additionally comprising:

E. means for applying a charge to said capacitor.

6. A load accessing means as in claim 5 wherein said means in each said decode circuit for applying the charge to said capacitor is a restore field effect transistor serially connected between said capacitor and a source of voltage and having a control pulse source coupled to its gate.

7. A load accessing means as in claim 6 wherein said controllable switch of each said decode circuit is a discharge field effect transistor having its current flow electrodes each connected to one of the electrodes of said capacitor, and said means controlling said switch is a plurality of parallel field effect transistors connected between a voltage source and the gate of said discharge field effect transistor, the gate of each of said plurality of parallel field effect transistors connected to a memory address line.

8. A load accessing means as in claim 1 wherein said load is a memory and said load driver circuit includes at least one bipolar transistor connected to a current flow electrode of said input field effect transistor.

9. A decode circuit having:

A. an input field effect transistor with a gate and two current flow electrodes, B. a capacitor connected across the gate and one of the current flow electrodes, the presence of a charge on said capacitor allowing current to pass through said input field effect transistor, C. means for completing a discharge path parallel to said capacitor comprising a discharge field effect transistor having its current flow electrodes each connected to one of the electrodes of said bootstrap capacitor, D. means controlling said means for completing a discharge path to cause completion of the discharge path comprising a plurality of parallel field effect transistors connected between a voltage source and the gate of said discharge field effect transistor, the gate of each of said plurality of parallel field effect transistors being connected to a memory address line, E. means for applying a charge to said bootstrap capacitor comprising a restore field effect transistor serially connected between said bootstrap capacitor and a source of voltage and having a control pulse source coupled to its gate, and F. an isolation field effect transistor serially connected between a reference potential insufficient to turn on said discharge field effect transistor and a current flow electrode of each of said parallel field effect transistors, and a control pulse source coupled to the gate of said isolation field effect transistor.

10. A decode circuit as in claim 9 in which said source of voltage connected to said restore field effect transistor and said voltage source connected to said plurality of parallel field effect transistors are common.

11. A decode circuit as in claim 9 in which said control pulse source coupled to the gate of said restore field effect transistor and said control pulse source coupled to the gate of said isolation field effect transistor are common.

12. A decode circuit as in claim 9 additionally comprising a second discharge field effect transistor connected between a current flow electrode of said input field effect transistor and a reference potential for discharging an inherent capacitance across said current flow electrode and the reference potential, and a means controlling said second discharge field effect transistor.

13. A decode circuit as in claim 12 wherein said means controlling said second discharge field effect transistor and said means controlling said discharge field effect transistor are common.

14. A decode circuit as in claim 9 additionally comprising a second isolation field effect transistor serially connected between said second discharge field effect transistor and said reference potential, whereby the application of a multiplexed signal to the gate of said discharge field effect transistor is insufficient to turn on said discharge field effect transistor in the absence of a control pulse applied to the gate of said second isolation field effect transistor.

15. A memory accessing means comprising:

A. a memory driver circuit, and

B. a plurality of parallel decode circuits each connected serially to said memory driver circuit, each decode circuit having:

1. an input field effect transistor with a gate and two current flow electrodes, the two current flow electrodes being connected between said memory and said memory driver circuit, 2. a capacitor connected across the gate and one of the current flow electrodes, the presence of a charge on said capacitor allowing current to pass through said input field effect transistor,
3. a discharge field effect transistor having its current flow electrodes each connected to one of the electrodes of said capacitor for selectively forming a discharge path internal to the decode circuit, thereby discharging said capacitor, and
4. a plurality of parallel field effect transistors connected between a voltage source and the gate of said discharge field effect transistor for selectively controlling said discharge field effect transistor to cause completion of the discharge path, the gate of each of said plurality of parallel field effect transistors being adapted for connection to a memory address line.

* * * * *